United States Patent
Winter et al.

(10) Patent No.: US 8,627,347 B1
(45) Date of Patent: Jan. 7, 2014

(54) SYSTEM AND METHOD FOR GENERATING AND PROVIDING A PROGRAM VIEWING INDICATOR

(75) Inventors: Itzik Winter, Givaat Shmuel (IL); Modi Finkelstein, Tel Aviv (IL); Amir Bassan Eskenazi, San Mateo, CA (US)

(73) Assignee: ARRIS Solutions, Inc., Suwanee, GA (US)

(*) Notice: Subject to any disclaimer, the term of this patent is extended or adjusted under 35 U.S.C. 154(b) by 399 days.

(21) Appl. No.: 12/098,461

(22) Filed: Apr. 7, 2008

Related U.S. Application Data (60) Provisional application No. 60/948,711, filed on Jul. 10, 2007.

(51) Int. Cl.
*H04H 60/33* (2008.01)
*H04H 60/56* (2008.01)
*H04N 7/16* (2011.01)
*H04N 7/10* (2006.01)
*H04N 7/025* (2006.01)

(52) U.S. Cl.
USPC ........ 725/14; 725/9; 725/10; 725/12; 725/25; 725/32

(58) Field of Classification Search
USPC ............................................. 725/58
See application file for complete search history.

(56) References Cited

U.S. PATENT DOCUMENTS

| | | | | |
|---|---|---|---|---|
| 5,153,580 | A | * | 10/1992 | Pollack .................... 340/825.25 |
| 5,251,324 | A | * | 10/1993 | McMullan, Jr. ................ 725/14 |
| 5,444,499 | A | * | 8/1995 | Saitoh ........................... 348/734 |
| 7,903,652 | B2 | * | 3/2011 | Huang et al. ................. 370/390 |
| 2002/0169913 | A1 | * | 11/2002 | Heizer et al. ................. 710/302 |
| 2004/0226034 | A1 | * | 11/2004 | Kaczowka et al. ............... 725/9 |
| 2005/0015805 | A1 | * | 1/2005 | Iwamura ......................... 725/79 |
| 2005/0213503 | A1 | * | 9/2005 | Guo et al. ..................... 370/230 |
| 2006/0015891 | A1 | * | 1/2006 | Lazzaro et al. .................... 725/9 |
| 2007/0157242 | A1 | * | 7/2007 | Cordray et al. ................. 725/46 |
| 2008/0183651 | A1 | * | 7/2008 | Hunter .......................... 706/47 |

* cited by examiner

*Primary Examiner* — Justin Shepard
(74) *Attorney, Agent, or Firm* — Troy A. Van Aacken (57) ABSTRACT

A method, system, and computer program product. The method includes: receiving a display power consumption level indicator; determining, in response to the display power consumption level indicator, whether a program that is sent to a signal converter that is coupled to the display, is being displayed on the display; and transmitting to a remote system, by the signal converter, and in response to the determining, a program viewing indicator.

21 Claims, 6 Drawing Sheets

SYSTEM AND METHOD FOR GENERATING AND PROVIDING A PROGRAM VIEWING INDICATOR

RELATED APPLICATIONS

This application claims priority from U.S. provisional patent Ser. No. 60/948,711 filed on Jul. 10, 2007.

FIELD OF THE INVENTION

The invention relates to methods, systems, and computer program products for providing a program viewing indicator.

BACKGROUND OF THE INVENTION

Various technologies were developed in order to utilize the limited bandwidth offered by media conveying networks. A first technology is known as switched digital video and includes selecting which programs out of a larger set of programs to broadcast to end users. Another technology utilizes the Internet Protocol to unicast (and additionally or alternatively to broadcast) programs to end users.

In both cases, the transmission of programs that are not being watched by the end user is regarded as a waste of bandwidth. It would have been better to transmit other programs than those that are not being watched.

End users tend to leave their set top box on after turning their television off. In this case, the monitoring of the status of the set boxes alone will not indicate that the program is not watched.

One prior art solution aimed to improve the utilization of bandwidth involves sending, by a remote monitor, to end users that did not perform a channel change for several hours, a request to respond. If the end user does not respond to the request then the remote monitor determines that the end user does not watch the program and it can determine not to transmit the program. The remote monitor can be located in various locations and can be used to monitor one or multiple end users.

There is a growing need to provide efficient systems, methods and computer program products for efficient utilization of bandwidth.

SUMMARY OF THE INVENTION

A method for providing a program viewing indicator, the method includes: (i) receiving a display power consumption level indicator; (ii) determining, in response to the display power consumption level indicator, whether a program that is sent to a signal converter that is connected to the display, is being displayed on the display; and (iii) transmitting to a remote system, by the signal converter, and in response to the determining, a program viewing indicator.

A method for transmitting a program, the method includes: (i) receiving at least one program viewing indicator from at least one signal converter, wherein each program viewing indicator is generated in response to a power consumption of a display connected to a signal converter; (ii) determining a program transmission scheme in response to the at least one program viewing indicator; and (iii) transmitting at least one program according to the program transmission scheme.

A computer readable medium having a computer-readable code embodied therein, the computer-readable code includes instructions for: (i) receiving a display power consumption level indicator; (ii) determining, in response to the display power consumption level indicator, whether a program that is sent to a signal converter that is connected to the display, is being displayed on the display; and (iii) transmitting to a remote system, by the signal converter, and in response to the determining, a program viewing indicator.

A computer readable medium having a computer-readable code embodied therein, the computer-readable code includes instructions for: (i) receiving at least one program viewing indicator from at least one signal converter, wherein each program viewing indicator is generated in response to a power consumption of a display connected to a signal converter; (ii) determining a program transmission scheme in response to the at least one program viewing indicator; and (iii) transmitting at least one program according to the program transmission scheme.

A system for providing a program viewing indicator, the system includes: (i) a sensor, adapted to monitor a display power consumption level; and (ii) a signal converter that is connected to the display, to the sensor and to a remote system; wherein the signal converter is adapted to: (a) receive from the sensor display power consumption level indicator; (b) determine, in response to the display power consumption level indicator, whether a program that is sent to the signal converter is being displayed on the display; and (c) transmit to the remote system, and in response to the determining, a program viewing indicator.

A system for transmitting a program, the system includes: (i) a receiver that is adapted to receive at least one program viewing indicator from at least one signal converter, wherein each program viewing indicator is generated in response to a power consumption of a display connected to a signal converter; (ii) a processor, adapted to determine a program transmission scheme in response to the at least one program viewing indicator; and (iii) a transmitter that is adapted to transmit at least one program according to the program transmission scheme.

A signal converter, that includes: an interface for receiving media signals and control signals; a media unit for converting the media signals to content to be displayed on a display; and a controller, wherein the controller is adapted to: control a change of a characteristic of the program that is presumably being displayed on an end user display; and determine that the program is being viewed by the end user if the response was received from the end user.

BRIEF DESCRIPTION OF THE DRAWINGS

The abovementioned and other objects, features, and advantages of the present invention will become more apparent from the following detailed description, when applied in conjunction with the accompanying drawings. In the drawings, similar reference characters denote similar elements throughout the different views, in which.

DETAILED DESCRIPTION OF THE DRAWINGS

Figure 1:
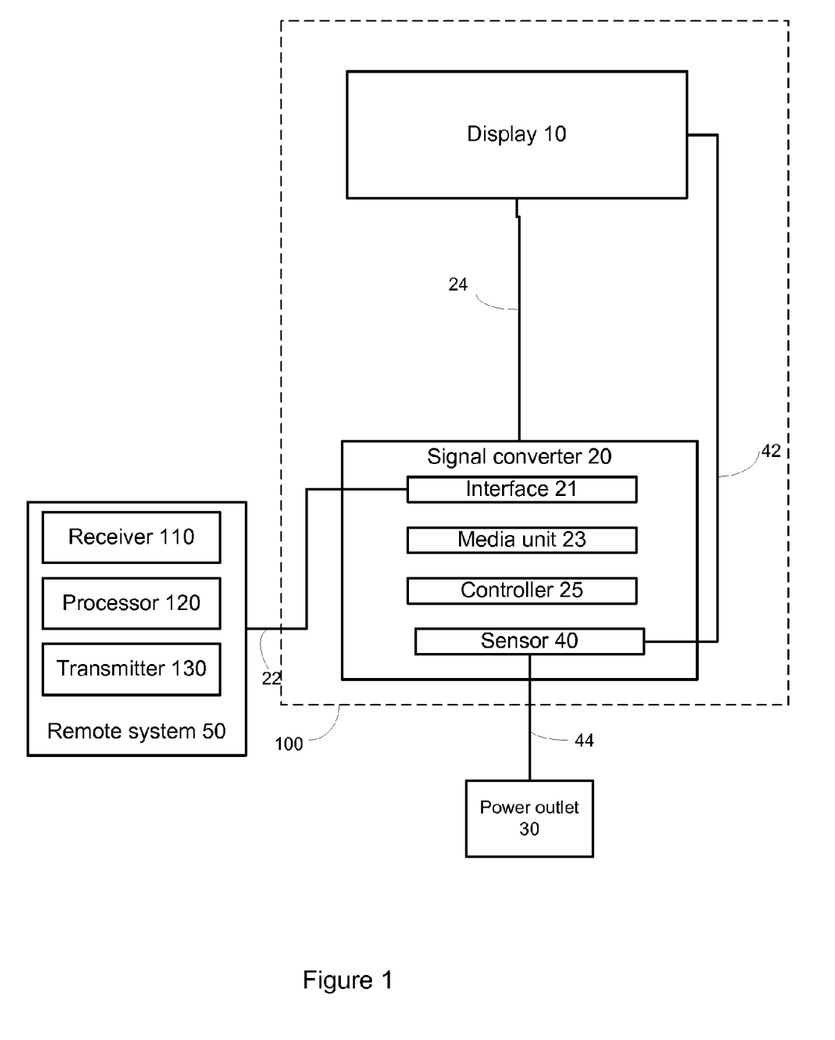
FIG. 1 illustrates a system and its environment, according to an embodiment of the invention.

FIG. 1 illustrates system 100 and its environment according to an embodiment of the invention.

System 100 includes sensor 40 and signal converter 20. Sensor 40 is adapted to monitor a display power consumption level.

FIG. 1 illustrates sensor 40 as being included within signal converter 20. Alternatively, sensor 40 can be integrated with signal converter 20 without being included within it.

Sensor 40 is connected between display 10 and a power source (illustrated by power outlet 30). FIG. 1 illustrates second power line 44 that is connected between power outlet 30 and signal converter 20 and also illustrates first power line 42 that is connected between signal converter 20 and display 10.

Sensor 40 is connected to first power line 42 and can monitor the power level consumption of display 10. It is noted that second power line 44 supplies power to signal converter 20, sensor 40 and display 10. It can be connected to a splitter that distributes the power between the components of signal converter 20, sensor 40, and display 10.

Signal converter 20 can be a set top box but this is not necessarily so. Signal converter 20 includes interface 21, media unit 23, and controller 25. Interface 21 receives media signals and control signals from remote system 50. Signal converter 20 also includes media unit 25 that converts the media signals (in response to the control signals) to content that is displayed on display 10. It can facilitate conditional access by decoding. Media unit 23 can also decrypt encrypted information. Controller 25 can determine to trigger a response from an end user. The response can be triggered by altering a characteristic of a program that is presumably viewed by the end user. If the end user responds to the trigger, the controller 25 can determine that the program is being viewed.

Figure 2:
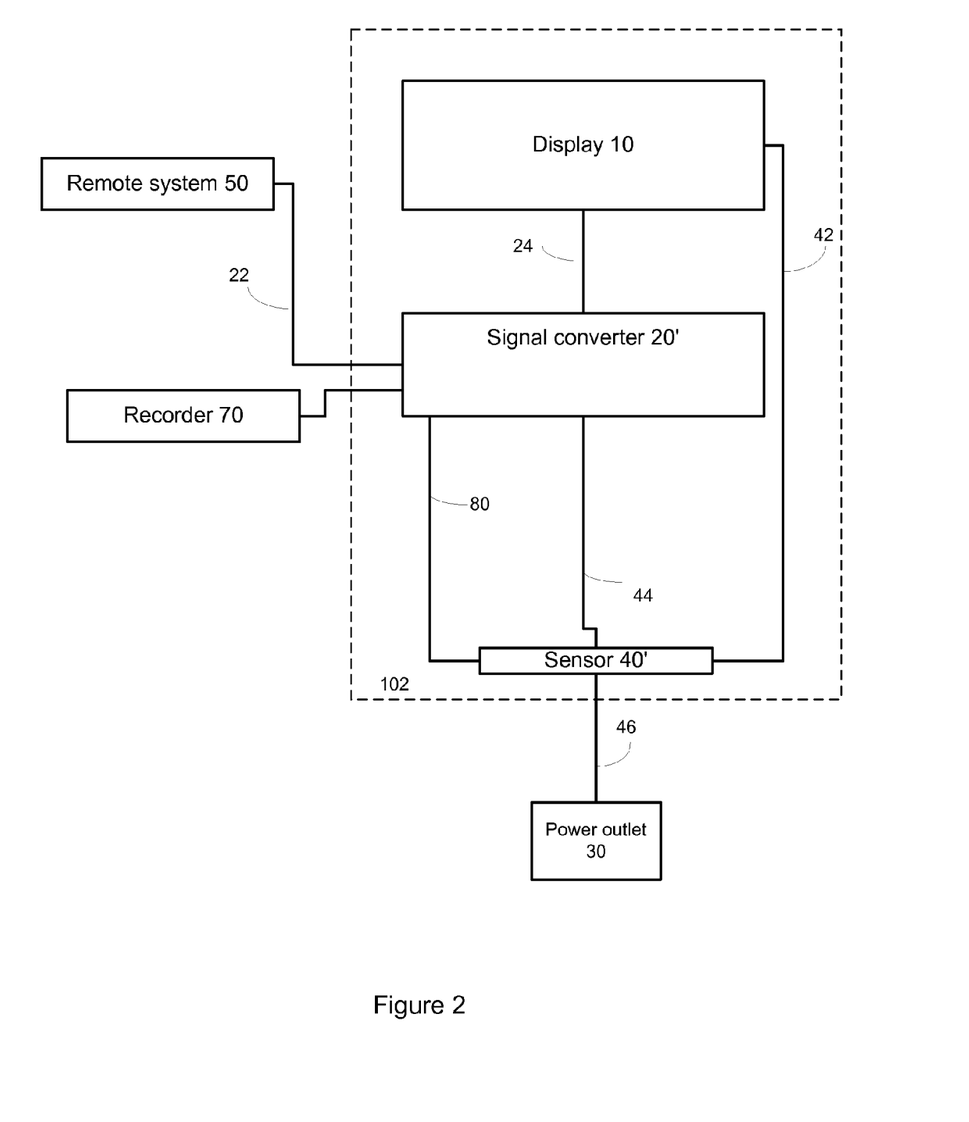
FIG. 2 illustrates a system and its environment, according to another embodiment of the invention.

Modern signal converters can exchange information with remote system 50. FIG. 2 illustrates link 22 between remote system 50 and signal converter 20. This link can include an uplink channel and a downlink channel. Link 22 can represent a single wire, multiple wires, a communication network, multiple communication networks, and the like.

Remote system 50 can be a part of a video broadcasting system, including but not limited to a cable system, an Internet Protocol based system and the like. Remote system 50 can be located in a hub, in a headend, in a VSO and the like. It can be a server, include transmitters, and can conveniently determine which programs to transmit.

Remote system 50 can apply switched digital video techniques, switched unicast techniques, switched multicast techniques, or a combination thereof.

Remote system 50 can try to improve the utilization of link 22 as well as the utilization of any resource limited (including bandwidth limited) component that participates in the provision of one or more programs to one or more signal converters.

Signal converter 20 can be integrated with display 10, can be a part of a computer, a part of a house entertainment center, and the like. According to an embodiment of the invention, it has recording capabilities but it can be, additionally or alternatively, connected to an external recorder such as recorder 70 of FIG. 2.

Signal converter 20 can be controlled by a remote control unit (not shown) and additionally or alternatively by an interface that is part of signal converter 20.

An end user can turn signal converter 20 on, turn signal converter 20 off, select which program to view and the like by using the remote control unit and/or the interface.

In addition to its video related capabilities, signal converter 20 can also: (i) receive from sensor 40 display power consumption level indicator; (ii) determine, in response to the display power consumption level indicator, whether a program that is sent to signal converter 20 is being displayed on display 10; and (iii) transmit to remote system 50, and in response to the determining, a program viewing indicator. The program viewing indicator will indicate that a program is not being viewed if display 10 is turned off (for at least a predetermined period).

Signal converter 20 can determine that the program is not being displayed on display 10 if display 10 is turned off for at least a predefined period. The duration of the predefined period can be one or few seconds, one or multiple minutes, and the like.

The display power consumption level indicator can include display power readings but additionally or alternatively can merely indicate whether display 10 is on or is off. Thus, sensor 40 or signal converter 20 can process display power readings to provide a binary (or non-binary) display power consumption level indicator. The processing can include one or more prior art processing stages such as but not limited to filtering, averaging, thresholding, and the like.

According to another embodiment of the invention signal converter 20 can be also aware that a program is being recorded (by signal converter or by a recorder) even if the program is not being displayed on display 10. This scenario can occur, for example, when the end user is away from home, during the middle of the night, and the like.

Signal converter 20 can be either programmed to record the program or receive an indication from a recorder (such as recorder 70 of FIG. 2) that is connected to signal converter 20 that the program is being recorded. The recorder can send to signal converter 20 a recording indication upon request but this is not necessarily so.

FIG. 2 illustrates system 102 according to an embodiment of the invention.

System 102 includes sensor 40' and signal converter 20'.

System 102 of FIG. 2 differs from system 100 of FIG. 1 by including recorder 70 and by the separation between sensor 40' and signal converter 20'. Accordingly, sensor 40' is not included within signal converter 20' and is not integrated with it.

FIG. 2 illustrates sensor 40' as being connected to third power line 46 as well as to first and second power lines 42 and 44. It is noted that this is not necessarily so. For example, sensor 40' can be connected to first power line 42 while not being connected to second power line.

Sensor 40' is connected to signal converter 20' via communication link 80 that enables sensor 40' to send the display power consumption level indicator to signal converter 20'.

Figure 3:
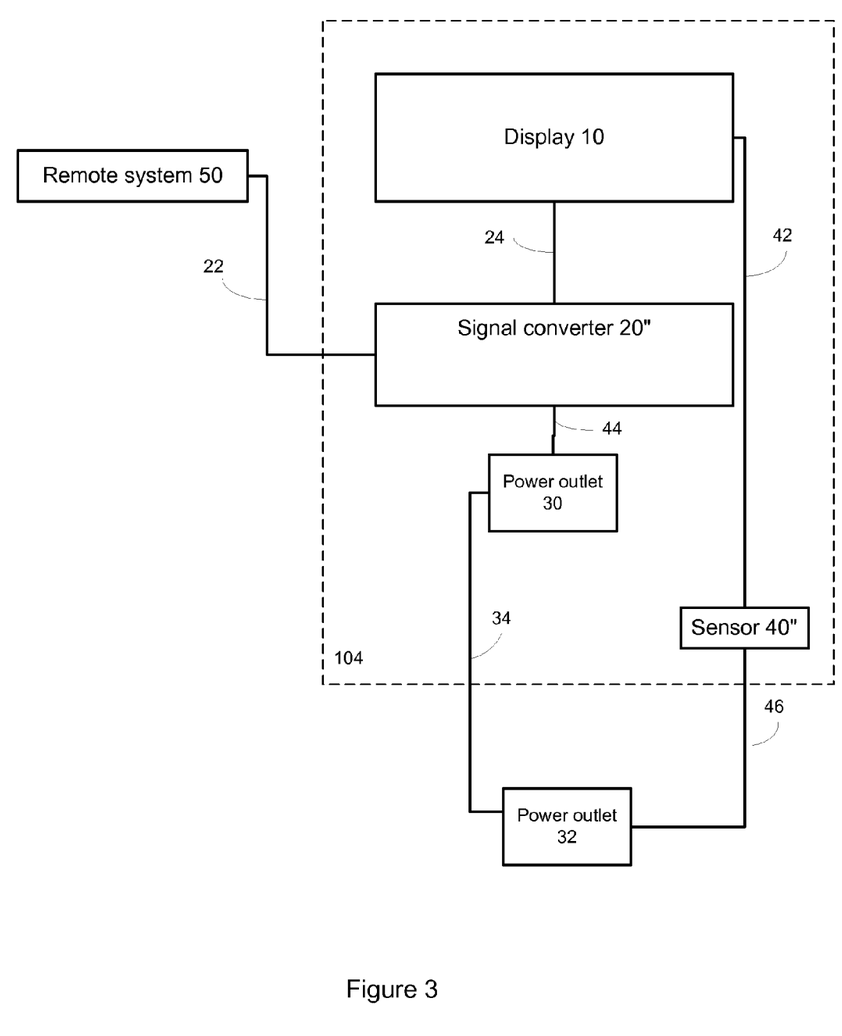
FIG. 3 illustrates a system and its environment, according to a further embodiment of the invention.

FIG. 3 illustrates system 104 according to an embodiment of the invention. For simplicity of explanation FIG. 3 does not illustrate a recorder although such a recorder can exist.

System 104 includes sensor 40" and signal converter 20". Sensor 40" communicates with signal converter 20" over a power line link that includes second power line 44, power outlets 30 and 32 and additional power line 34.

Each one of signal converter 20" and sensor 40" includes a modem (or is connected to such a modem) that facilitates the exchange of information over power links.

FIG. 3 illustrates remote system 50 for transmitting a program, according to an embodiment of the invention Remote system 50 includes: (i) receiver 110 that is adapted to receive at least one program viewing indicator from at least one signal converter, wherein each program viewing indicator is generated in response to a power consumption of a display that is connected to a signal converter; (ii) processor 120, adapted to determine a program transmission scheme in response to the at least one program viewing indicator; and (iii) transmitter 130 that is adapted to transmit at least one program according to the program transmission scheme.

Processor 120 can include one or more computers, can be included within a computer, can be a blade server, a server, a lap top computer, and the like.

It is noted that these components (receiver 110, processor 120, and transmitter 130) can be located near each other or can be integrated together, but can also be located in different locations. For example, processor 120 can be located at a headend while receiver 110 can be located at a hub. Receiver 110 can be connected to multiple signal converters over a hybrid fiber coax (HFC) infrastructure or over IP networks. The multiple signal converters can form a service group, a portion of a service group of multiple service groups.

According to an embodiment of the invention signal converter 20 can try to trigger a response from an end user and (ii) determine that the program is being viewed if the end user responded to the trigger. The trigger can involve altering the end user viewing experience, conveniently by hampering that experience and especially by lowering the volume of the program. The signal converter 20 or a remote system can determine that such triggering is necessary. The triggering can occur after a predefined period lapses.

The volume of the program can be controlled by setting audio metadata (such as AC-3 compliant header) that once processed by signal converter 20, 20' or 20" determines the volume of audio that is heard when the program is being displayed on display 10.

Signal converter 20, 20' or 20" can lower the volume of the program and determine that the program is being viewed by the end user if a request to increase the volume of the program is received in response to the lowering of the volume.

The audio metadata of the program can be set so that the volume of the program is gradually decreased until the volume is below a predefined threshold.

Signal converter 20 is adapted to determine that the program is being viewed by the end user if the end user requests to increase the volume of the program before an end of a predefined time window that starts when the volume of the program decreases below the predefined threshold. Signal converter 20 can perform the determination by executing software or firmware.

Figure 4:
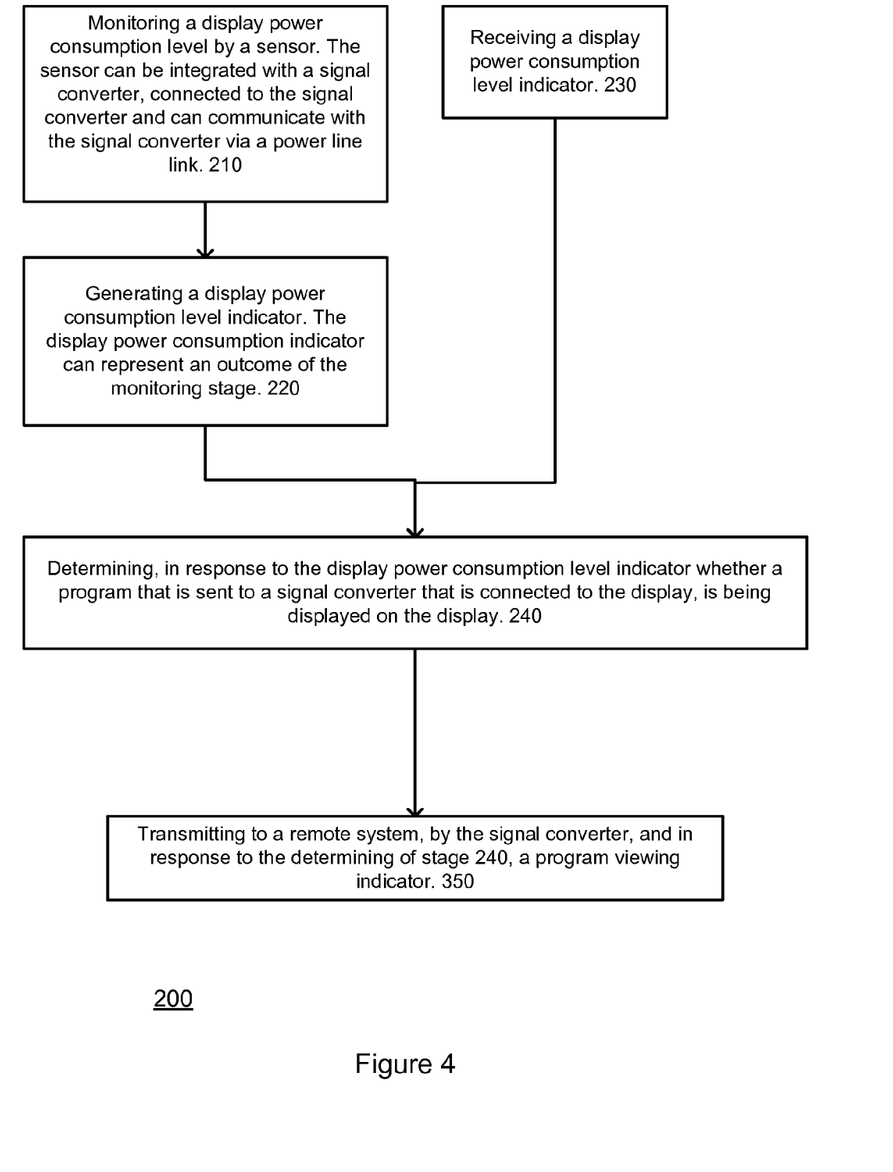
FIG. 4 illustrates a method according to an embodiment of the invention.

FIG. 4 illustrates method 200 according to an embodiment of the invention.

Method 200 can start by stage 210 or stage 230.

Stage 210 includes monitoring a display power consumption level by a sensor. The sensor can be integrated with a signal converter, connected to the signal converter and can communicate with the signal converter via a power line link.

Stage 210 is followed by stage 220 of generating a display power consumption level indicator. The display power consumption indicator can represent an outcome of the monitoring stage.

Stage 230 includes receiving a display power consumption level indicator.

Stages 220 and 230 are followed by stage 240 of determining, in response to the display power consumption level indicator, whether a program that is sent to a signal converter that is coupled to the display, is being displayed on the display.

Stage 240 is followed by stage 250 of transmitting to a remote system, by the signal converter, and in response to the determining, a program viewing indicator.

It is noted that the transmitting can occur in a periodical manner, in response to changes in the value of the program viewing indicator or in a combination thereof. The transmitting and even the monitoring can be executed according to a predetermined timing scheme, in a random manner, in a pseudo-random manner and the like.

The timing of the transmitting and/or the monitoring can be determined in response to various parameters such as the expected load on a network, bandwidth constraints, number of requests to receive media content that are not provided due to bandwidth limitations, and the like.

Figure 5:
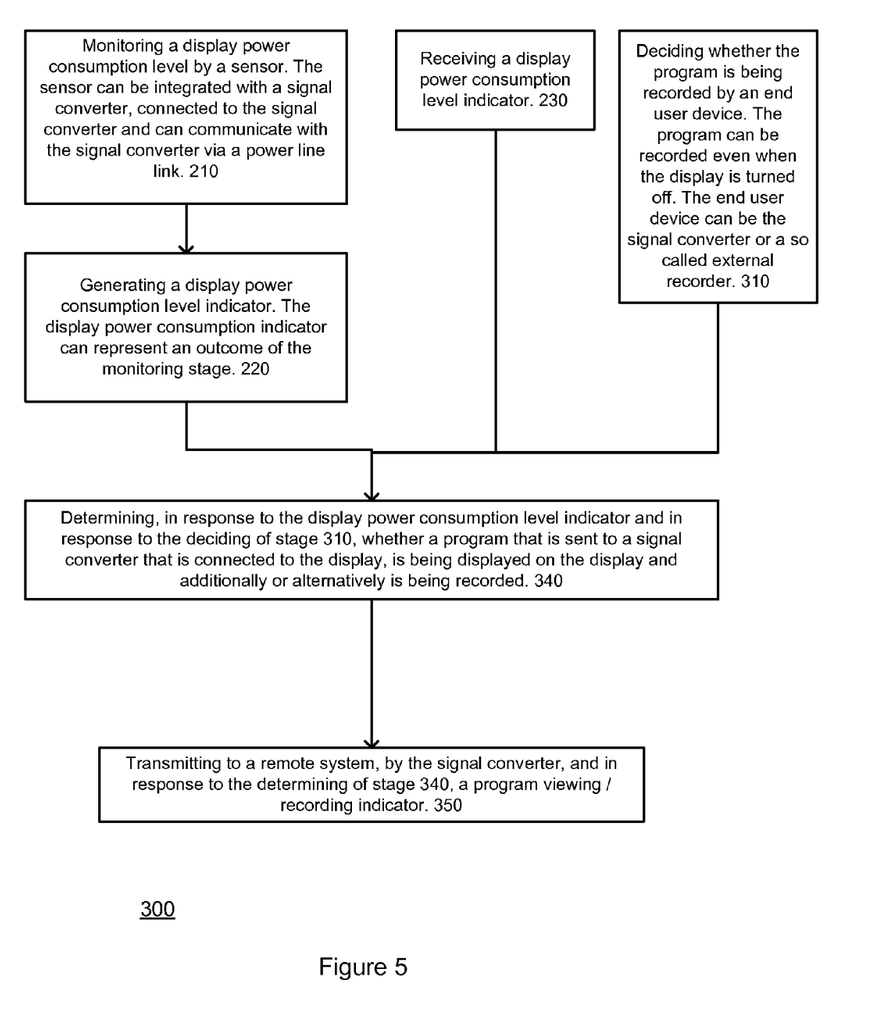
FIG. 5 illustrates a method according to an embodiment of the invention.

FIG. 5 illustrates method 300 according to an embodiment of the invention.

Method 300 can start by stage 210, stage 230, or stage 310.

Stage 210 includes monitoring a display power consumption level by a sensor. The sensor can be integrated with a signal converter, connected to the signal converter and can communicate with the signal converter via a power line link.

Stage 210 is followed by stage 220 of generating a display power consumption level indicator. The display power consumption indicator can represent an outcome of the monitoring stage.

Stage 230 includes receiving a display power consumption level indicator.

Stage 310 includes deciding whether the program is being recorded by an end user device. The program can be recorded even when the display is turned off. The end user device can be the signal converter or a so called external recorder.

Stage 220, 230 and 310 are followed by stage 340 of determining, in response to the display power consumption level indicator and in response to the deciding of stage 310, whether a program that is sent to a signal converter that is connected to the display, is being displayed on the display and additionally or alternatively is being recorded.

Stage 340 is followed by stage 350 of transmitting to a remote system, by the signal converter, and in response to the determining of stage 340, a program viewing/recording indicator. The program viewing/recording indicator indicates whether the program is being displayed on the display and additionally or alternatively is being recorded.

Figure 6:
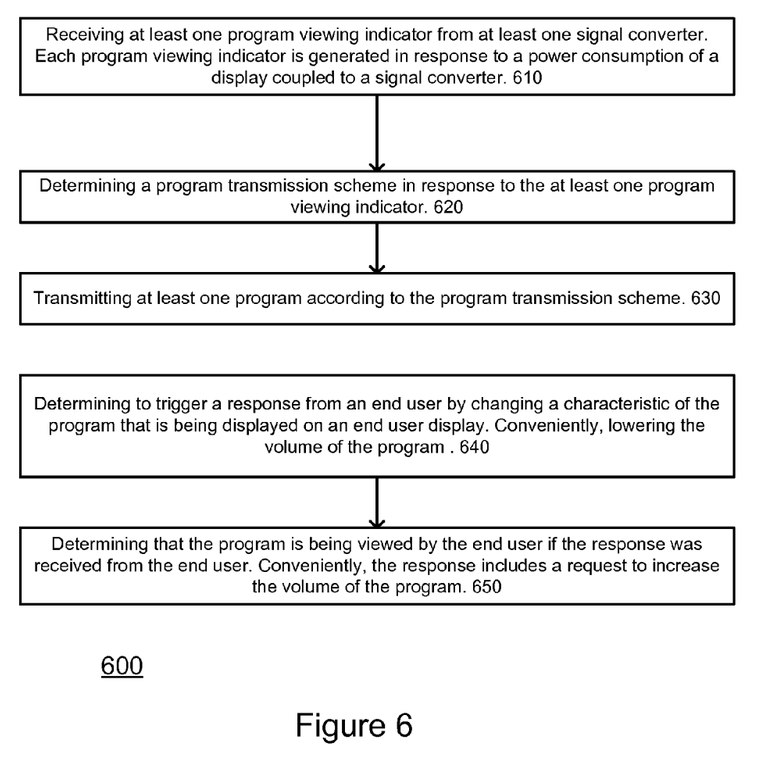
FIG. 6 illustrates a method according to an embodiment of the invention.

FIG. 6 illustrates method 600 according to an embodiment of the invention.

Method 600 starts by stage 610 of receiving at least one program viewing indicator from at least one signal converter. Each program viewing indicator is generated in response to a power consumption of a display coupled to a signal converter.

Stage 610 is followed by stage 620 of determining a program transmission scheme in response to the at least one program viewing indicator.

Stage 620 is followed by stage 630 of transmitting at least one program according to the program transmission scheme.

According to another embodiment of the invention stage 610 can include receiving at least one program viewing/recording indicator from at least one signal converter and stage 620 includes determining a program transmission scheme in response to the at least one program viewing/recording indicator.

Method 600 can also include stage 640 determining to trigger a response from an end user by changing a characteristic of the program that is being displayed on an end user display. Conveniently, lowering the volume of the program.

Stage 640 is followed by stage 650 of determining that the program is being viewed by the end user if the response was received from the end user. Conveniently, the response includes a request to increase the volume of the program.

Stage 640 can include transmitting a program that is characterized by a gradual decrement of the volume of the program, wherein the decrement stops only after the volume is below a predefined threshold.

In this case, stage 650 can include determining that the program is being viewed by the end user if the end user requests to increase the volume of the program before an end of a predefined time window that starts when the volume of the program decreases below the predefined threshold.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

The term "coupled," as used herein, is not intended to be limited to a direct coupling or a mechanical coupling.

However, other modifications, variations, and alternatives are also possible. The specifications and drawings are, accordingly, to be regarded in an illustrative rather than in a restrictive sense.

Unless stated otherwise, terms such as "first" and "second" are used to arbitrarily distinguish between the elements such terms describe. Thus, these terms are not necessarily intended to indicate temporal or other prioritization of such elements.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for providing a program viewing indicator, the method comprises:
    receiving a display power consumption level indicator;
    determining, in response to the display power consumption level indicator, whether a program that is sent to a signal converter that is coupled to the display, is being displayed on the display;
    transmitting to a remote system over a network, by the signal converter, and in response to the determining, a program viewing indicator; and
    discontinuing to transmit the program to the to the signal converter from the remote system in response to determining that the program is not being provided to the display;
    wherein a timing of at least one of the determining and the transmitting is determined in response to a number of requests to receive media content that are not provided due to bandwidth constraints.

2. The method according to claim 1, wherein the requests to receive media content that are not provided due to bandwidth constraints are received by the remote system, and the remote system triggers the signal converter to determine whether the program is being displayed on the display device.

3. The method according to claim 1 comprising monitoring a display power consumption level by a sensor that communicates with the signal converter over a power line link; wherein the display power consumption level indicator comprises display power readings of more than two levels.

4. The method according to claim 1 comprising deciding whether the program is being recorded by an end user device; and transmitting to the remote system, by the signal converter, and in response to the determining and to the deciding, a program viewing/recording indicator.

5. The method according to claim 1, wherein the timing of the transmitting is determined in response to the number of requests to receive media content that are not provided due to bandwidth constraints.

6. A method for transmitting a program, the method comprises:
    receiving by a remote system at least one program viewing indicator from at least one signal converter, wherein each program viewing indicator is generated in response to a power consumption of a display coupled to a signal converter;
    determining a program transmission scheme for transmission over a network that couples between the remote system and the at least one signal converter in response to the at least one program viewing indicator; wherein the remote system is located in either one of a hub, a headend, and a Video Service Office (VSO);
    transmitting at least one program over the network according to the program transmission scheme, wherein the network couples between the remote system and the at least one signal converter and wherein the remote system is located in either one of a hub, a headend, and a Video Service Office (VSO); and
    discontinuing to transmit an unwatched program to the to the at least one signal converter from the remote system in response to determining that the program is not being provided to the display based on the at least one program viewing indicator received from the at least one signal converter.

7. The method according to claim 6 comprising:
    determining, by a remote system, to trigger a response from an end user by changing a characteristic of the program that is transmitted from the remote system to a signal converter and is presumably being displayed on an end user display that is coupled to the end user display; and
    determining that the program is being viewed by the end user if the response was received from the end user.

8. The method according to claim 7 comprising setting audio metadata that is transmitted over the network, that once processed by the signal converter determines a volume of audio that is heard when the program is being displayed on a display.

9. The method according to claim 7 comprising: lowering a volume of the program that is presumably being displayed on the end user display; and determining that the program is being viewed by the end user if the end user requests to increase the volume of the program before an end of a predefined time window that starts when the volume of the program decreases below the predefined threshold.

10. A non-transitory computer readable medium having a computer-readable code embodied therein, the computer-readable code comprises instructions for:

receiving a display power consumption level indicator;

determining, in response to the display power consumption level indicator, whether a program that is sent to a signal converter that is coupled to the display, is being displayed on the display;

transmitting to a remote system over a network, by the signal converter, and in response to the determining, a program viewing indicator; wherein a timing of at least one of the determining and the transmitting is determined in response to a number of requests to receive media content that are not provided due to bandwidth constraints; and discontinuing to transmit an unwatched program to the to the signal converter from the remote system in response to determining that the program is not being provided to the display.

11. The non-transitory computer readable medium of claim 10 wherein the computer-readable code comprises instructions for generating the display power consumption level indicator by the signal converter; wherein the signal converter is integrated with a sensor; wherein the timing of the determining is determined in response to at least one parameter out of an expected load on the network, bandwidth constraints, and the number of requests to receive media content that are not provided due to bandwidth constraints.

12. The non-transitory computer readable medium of claim 10 wherein the computer-readable code comprises instructions for receiving display power consumption level indicator from a sensor that is coupled to the signal converter; wherein the timing of the transmitting is determined in response to a number of requests to receive media content that are not provided due to bandwidth constraints.

13. The non-transitory computer readable medium of claim 10 wherein the computer-readable code comprises instructions for receiving display power consumption level indicator from a sensor that is coupled to the signal converter over a power line link; wherein the display power consumption level indicator comprises display power readings of more than two levels.

14. The non-transitory computer readable medium of claim 10 wherein the computer-readable code comprises instructions for deciding whether the program is being recorded by an end user device; and transmitting to the remote system, by the signal converter, and in response to the determining and to the deciding, a program viewing/recording indicator.

15. The non-transitory computer readable medium according to claim 10, wherein the timing of the transmitting is determined in response to the number of requests to receive media content that are not provided due to bandwidth constraints.

16. A non-transitory computer readable medium having a computer readable code embodied therein, the computer-readable code comprises instructions for:

receiving by a remote system at least one program viewing indicator from at least one signal converter, wherein each program viewing indicator is generated in response to a power consumption of a display coupled to a signal converter;

determining a program transmission scheme for transmission over a network; wherein the network couples between the remote system and the at least one signal converter and wherein the remote system is located in either one of a hub, a headend, and a Video Service Office (VSO);

transmitting at least one program over the network according to the program transmission scheme, wherein the network couples between the remote system and the at least one signal converter and wherein the remote system is located in either one of a hub, a headend, and a Video Service Office (VSO); and discontinuing to transmit an unwatched program to the to the at least one signal converter from the remote system in response to determining that the program is not being provided to the display based on the at least one program viewing indicator received from the at least one signal converter.

17. The non-transitory computer readable medium of claim 16 wherein the computer-readable code comprises instructions for:

determining, by a remote system, to trigger a response from an end user by changing a characteristic of the program that is transmitted from the remote system to a signal converter and is presumably being displayed on an end user display that is coupled to the end user display; and determining that the program is being viewed by the end user if the response was received from the end user.

18. The non-transitory computer readable medium of claim 17 wherein the computer-readable code comprises instructions for: control in response to audio metadata a lowering a volume of the program that is presumably being displayed on the end user display; and determine that the program is being viewed by the end user if the end user requests to increase the volume of the program before an end of a predefined time window that starts when the volume of the program decreases below the predefined threshold.

19. The non-transitory computer readable medium of claim 16 wherein the computer-readable code comprises instructions for: lowering a volume of the program that is presumably being displayed on the end user display; and determining that the program is being viewed by the end user if the end user requests to increase the volume of the program before an end of a predefined time window that starts when the volume of the program decreases below the predefined threshold.

20. A system for transmitting a program, the system comprises:

a receiver of a remote system that is adapted to receive at least one program viewing indicator from multiple signal converters, wherein each program viewing indicator is generated in response to a power consumption of a display coupled to a signal converter;

a processor, adapted to determine a program transmission scheme for a transmission over a network in response to the at least one program viewing indicator; wherein the network couples between the remote system and the at least one signal converter and wherein the remote system is located in either one of a hub, a headend, and a Video Service Office (VSO);

a transmitter that is adapted to transmit at least one program over the network according to the program transmission scheme wherein the network couples between the remote system and the at least one signal converter and wherein the remote system is located in either one of a hub, a headend, and a Video Service Office (VSO); and wherein the transmitter is operable to discontinue to transmit an unwatched program to the to the at least one signal converter from the remote system in response to determining that the program is not being provided to the display based on the at least one program viewing indicator received from the at least one signal converter.

21. A signal converter, comprising:

a sensor for monitoring a display power consumption level and for generating a display power consumption level indicator that comprises display power readings of more than two levels;

an interface for receiving media signals and control signals;

a media unit for converting the media signals to content to be displayed on a display and;

a controller, wherein the controller is adapted to: control a change of a characteristic of the program that is presumably being displayed on an end user display in response to audio metadata that is part of the media signals and control signals; and determine that the program is being viewed by the end user if the response was received from the end user; and discontinue to transmit an unwatched program to the to the signal converter from the remote system in response to determining that the program is not being viewed by the end user.

\* \* \* \* \*